United States Patent
Edström et al.

(10) Patent No.: US 11,350,456 B2
(45) Date of Patent: May 31, 2022

(54) NETWORK NODE AND METHOD FOR EVALUATING CHANNEL OF LICENSE-ASSISTED ACCESS CELL IN WIRELESS COMMUNICATION NETWORK

(71) Applicant: Telefonaktiebolaget LM Ericsson (publ), Stockholm (SE)

(72) Inventors: Krister Edström, Hjärup (SE); Henrik Jeppsson, Lund (SE); Stefan Persson, Ystad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 38 days.

(21) Appl. No.: 16/765,289

(22) PCT Filed: Dec. 8, 2017

(86) PCT No.: PCT/EP2017/082078
§ 371 (c)(1),
(2) Date: May 19, 2020

(87) PCT Pub. No.: WO2019/110126
PCT Pub. Date: Jun. 13, 2019

(65) Prior Publication Data
US 2021/0144765 A1 May 13, 2021

(51) Int. Cl.
*H04W 74/08* (2009.01)
*H04W 48/16* (2009.01)

(52) U.S. Cl.
CPC ....... *H04W 74/0816* (2013.01); *H04W 48/16* (2013.01)

(58) Field of Classification Search
CPC . H04W 74/0816; H04W 48/16; H04W 74/04; H04W 74/0825
See application file for complete search history.

(56) References Cited

U.S. PATENT DOCUMENTS 10,257,856 B2   4/2019   Park et al.

FOREIGN PATENT DOCUMENTS

| WO | 2016161710 A1 | 10/2016 |
| WO | 2017010799 A1 | 1/2017 |
| WO | 2017023056 A1 | 2/2017 |
| WO | 2017063779 A1 | 4/2017 |

OTHER PUBLICATIONS

Kyocera, "DRS Design From the Aspect of Multiplexing PDSCH and DRS", 3GPP TSG RAN WG1 Meeting #82bis, Malmö, Sweden, Oct. 5, 2015, pp. 1-3, R1-155532, 3GPP.

(Continued)

*Primary Examiner* — Wayne H Cai
(74) *Attorney, Agent, or Firm* — Coats & Bennett, PLLC

(57) ABSTRACT

A network node (110) and method therein for evaluating a channel in a License Assisted Access, LAA, cell in a wireless communication network (100) are disclosed. The network node starts a Listen Before Talk, LBT, procedure for data transmission when a Discovery Reference Signal, DRS, is to be transmitted; and start an LBT procedure for DRS transmission in parallel with the LBT procedure for data transmission when a time of the LBT procedure for data transmission reaches a predefined value or the LBT procedure for data transmission fails.

4 Claims, 4 Drawing Sheets

(56) References Cited

OTHER PUBLICATIONS

3rd Generation Partnership Project, "3rd Generation Partnership Project; Technical Specification Group Radio Access Network; Evolved Universal Terrestrial Radio Access (E-UTRA); Physical Layer Procedures (Release 13)", Technical Specification, 3GPP TS 36.213 V13.2.0, Jun. 1, 2016, pp. 1-381, 3GPP.

Barr, J., "Listen Before Talk Issues", IEEE P802.19 Wireless Coexistence, Nov. 10, 2008, pp. 1-4, IEEE P802.19-08/0034r0, IEEE.

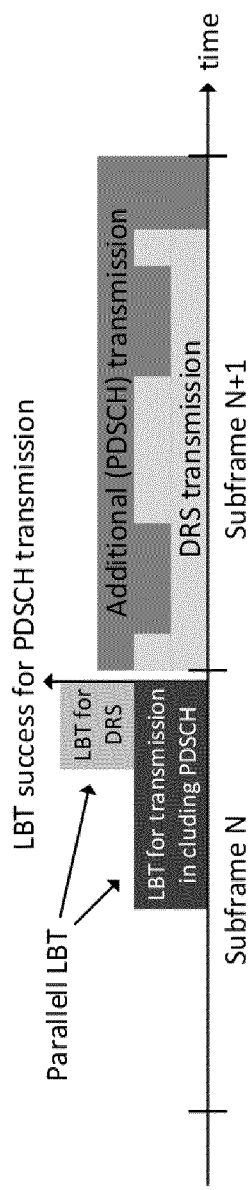
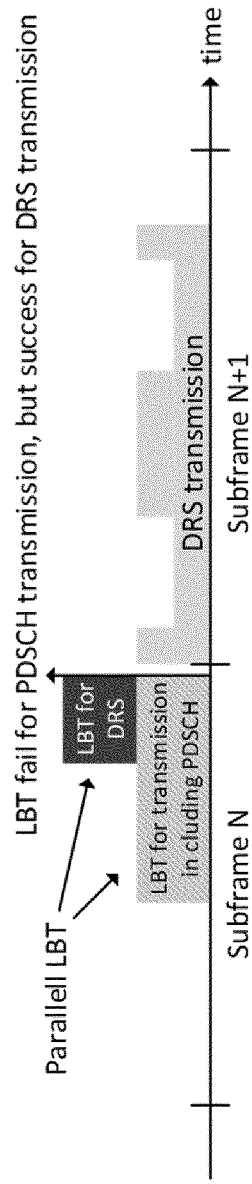
Fig. 4a
Fig. 4b

NETWORK NODE AND METHOD FOR EVALUATING CHANNEL OF LICENSE-ASSISTED ACCESS CELL IN WIRELESS COMMUNICATION NETWORK

TECHNICAL FIELD

Embodiments herein relate to a network node and method therein for evaluating a channel in a License-Assisted Access (LAA) cell in a wireless communication network. In particular, they relate to how to start channel access procedures.

BACKGROUND

Wireless communication networks, such as Global System for Mobile Communications (GSM) networks, Wideband Code Division Multiple Access (WCDMA) or High Speed Packet Access (HSPA) networks, Long Term Evolution (LTE) networks, usually cover a geographical area which is divided into cell areas. Each cell area is served by a base station, which may also be referred as a network node, Base Station, an access node etc. A wireless communication network may include a number of cells that can support communications for a number of wireless communication devices or user equipment (UEs).

To allow LTE transmission in unlicensed bands, the 3rd Generation Partnership Project (3GPP) has introduced License-Assisted Access (LAA). LAA uses carrier aggregation in the downlink to combine LTE in unlicensed spectrum with LTE in the licensed band. LAA provides the usage of supplementary downlink carriers in unlicensed bands. In order to avoid interfering with ongoing transitions, like LAA or Wi-Fi, a procedure of evaluating a channel is performed, which is called channel access procedure or Listen Before Talk (LBT), and is described in detail by 3GPP.

In a LAA cell, a Discovery Reference Signal (DRS) is sent to allow a UE both to synchronize to a cell and to do measurements. A DRS contains Primary Synchronization Signal (PSS), Secondary Synchronization Signal (SSS) and Cell-specific Reference Signal (CRS). It might also include Channel State Information Reference Signal (CSI-RS). The DRS can only be sent in one out of six consecutive subframes with a periodicity of 40, 80 or 160 ms. Therefore, it is of high importance that LBT success is achieved.

There are a few different LBT procedures for different types of transmissions described in 3GPP specifications. For example, a normal, single cell, LBT procedure for data transmission is described as well as a shorter LBT procedure for sending DRS only. The normal LBT procedure allows sending several subframes of data, where the number of subframes depends on access priority class. The shorter DRS LBT allows transmission for one sub-frame only. With a normal LBT procedure it is also allowed to send only DRS.

In the current solution the data/DRS to be sent is used to decide which LBT procedure to use, then trigger the LBT procedure, and, if LBT procedure is successful, the data/DRS is transmitted.

There is a benefit with doing a normal procedure LBT for DRS transmission since it is then possible to include some other relevant data, including PDSCH, within one subframe where transmission is allowed. Adding more useful data also has the benefit of reducing the risk of someone else starting a transmission on the channel during DRS transmission.

If aiming for transmitting more than regular DRS information, the time for LBT procedure will be longer and consequently the risk for getting LBT procedure failure will increase. Since the DRS contains important information for a UE, this is a serious drawback. So with the current implementation there is either a higher risk of not sending the DRS, or a higher risk of missing an opportunity to send additional data, depending on selected LBT algorithm. There is also an increased risk that another source starts to transmit in the middle of the DRS subframes.

SUMMARY

It is therefore an object of embodiments herein to provide an improved method and apparatus for evaluating a channel in a LAA cell in a wireless communication network.

According to one aspect of embodiments herein, the object is achieved by a method performed in a network node for evaluating a channel in an LAA cell in a wireless communication network. The network node starts an LBT procedure for data transmission when a DRS is to be transmitted. Then the network node starts an LBT procedure for DRS transmission in parallel with the LBT procedure for data transmission when a time of the LBT procedure for data transmission reaches a predefined value or the LBT procedure for data transmission is fail.

The network node may transmit a DRS together with any data to be transmitted when the LBT procedure for data transmission is successful.

The network node may transmit a DRS when the LBT procedure for data transmission is unsuccessful and the LBT procedure for DRS transmission is successful.

According to one aspect of embodiments herein, the object is achieved by a network node for evaluating a channel in an LAA cell in a wireless communication network. The network node is configured to start an LBT procedure for data transmission when a DRS is to be transmitted. The network node is further configured to start an LBT procedure for DRS transmission in parallel with the LBT procedure for data transmission when a time of the LBT procedure for data transmission reaches a predefined value or the LBT procedure for data transmission fails.

The network node may be further configured to transmit a DRS together with any data to be transmitted when the LBT procedure for data transmission is successful.

The network node may be further configured to transmit a DRS when the LBT procedure for data transmission is unsuccessful and the LBT procedure for DRS transmission is successful.

In other words, according to embodiments herein, when a DRS shall be transmitted, the network node starts a normal LBT for data transmission to finalizing just before the boundary of subframes. When getting closer to the boundary of subframes, starts a shorter LBT for DRS in parallel with the first normal LBT.

When approaching the boundary of subframes, there is a possibility to select what to transmit. If the normal LBT is successful it is possible to transmit DRS together with other useful data. If the normal LBT fails, there is still a possibility that the shorter LBT for DRS is successful. If so, it is possible to transmit DRS without PDSCH.

Therefore, the embodiment herein adds the possibility to add more data in a DRS subframe, without increasing the risk for not being allowed to transmit due to LBT failure. In this way, spectrum resources are utilized in a more efficient manner by means of using more resource elements when transmission is allowed.

Therefore, the embodiments herein provide an improved method and apparatus for evaluating a channel in a LAA cell in a wireless communication network.

BRIEF DESCRIPTION OF THE DRAWINGS

Examples of embodiments herein are described in more detail with reference to attached drawings in which:

FIGS. 4a and 4b are diagrams depicting examples of LBT procedures according to embodiments herein;

DETAILED DESCRIPTION

Figure 1:
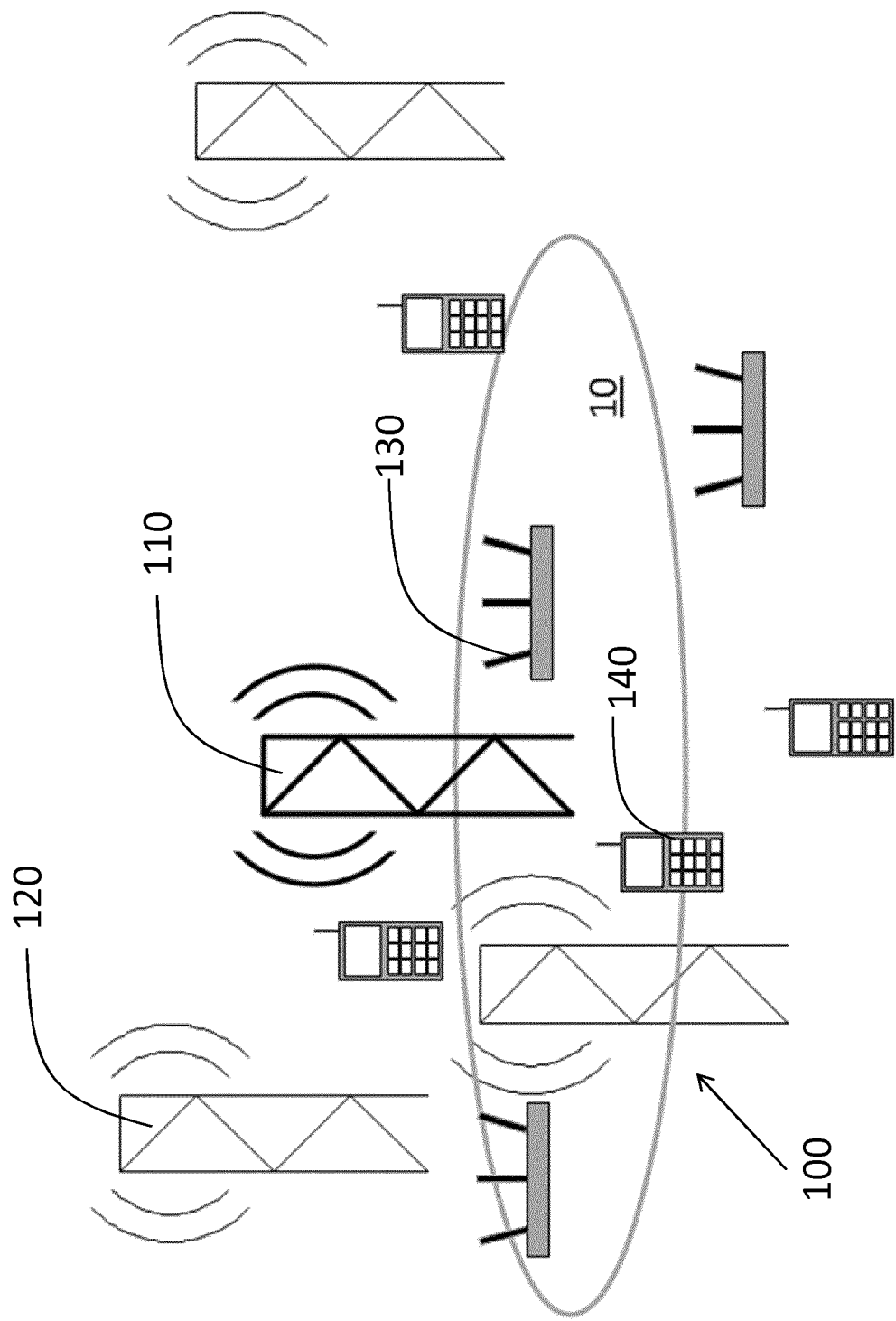
FIG. 1 is a schematic block diagram illustrating an LAA cell in a wireless communication network.

FIG. 1 depicts an example of a network node 110 serving an LAA cell 10 in a wireless communication network 100 in which embodiments herein may be implemented. The wireless communication network 100 may be any wireless system or cellular network, such as a Long Term Evolution (LTE) network, any 3rd Generation Partnership Project (3GPP) cellular network, Worldwide interoperability for Microwave Access (WiMAX) network, Wireless Local Area Network (WLAN/Wi-Fi), a Fourth Generation (4G) or LTE advanced network, a Fifth Generation (5G) or New Radio (NR) network etc.

An LAA cell 10 may have several surrounding transmission sources, like other network node 120 serving another LAA cell, WiFi access point 130 and mobile device 140, etc. All sources compete about transmission resources, and must therefore do LBT procedure.

Therefore, for an LAA cell, with surrounding transmission sources competing for transmission time as shown in FIG. 1, it is important to have a channel access procedure or LBT to perform efficient channel evaluation, that is compliant to regulation and still give as high probability as possible for transmission.

Figure 2:
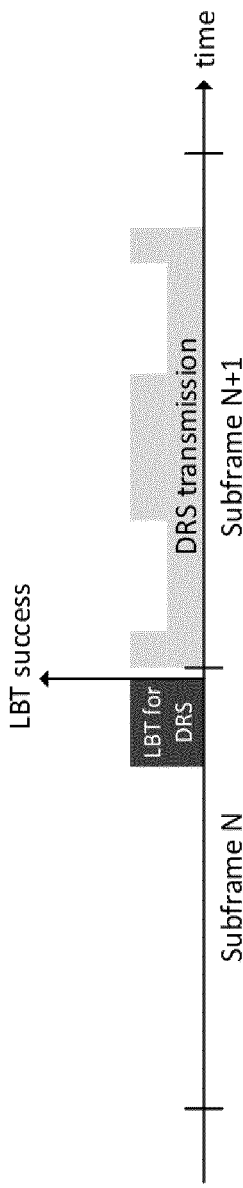
FIG. 2 is a diagram depicting a normal DRS transmission including LBT procedure.

FIG. 2 shows a normal DRS transmission including LBT procedure, i.e. a legacy LBT procedure for DRS. As shown in FIG. 2, a short LBT for DRS is performed just before a subframe boundary, e.g. just before the transmission time for subframe N is finished. Then the DRS transmission may start at the subframe boundary if the LBT procedure for DRS succeeds.

As discussed in the background, it may be beneficial to include other data when sending a DRS, but it is important not to make the LBT procedure success harder to achieve. Therefore, parallel LBT procedures for normal DRS transmission and for DRS transmission including Physical Downlink Shared Channel (PDSCH), are performed according to embodiments herein.

Figure 3:
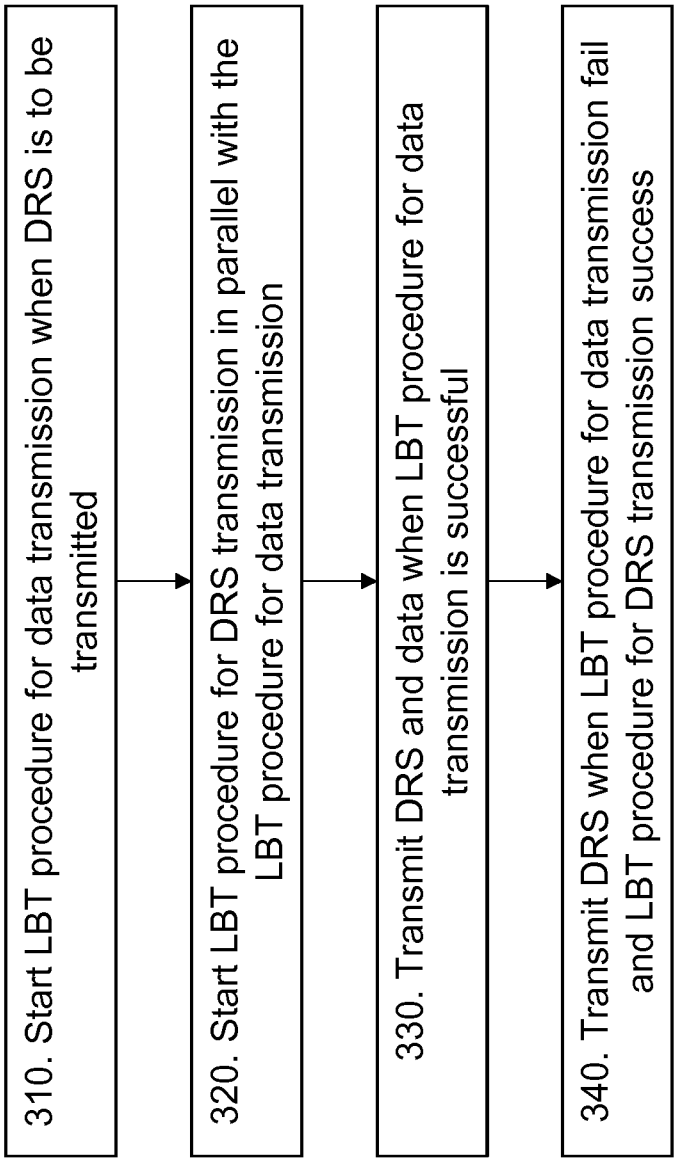
FIG. 3 is a flowchart illustrating a method performed in a network node according to embodiments herein.

Example of embodiments of a method performed in a network node 110 for evaluating a channel in an LAA cell in a wireless communication network 100 will now be described with reference to FIG. 3. The network node 110 may be any one of a base station an access node, UE or mobile device etc. The method comprises the following actions.

Action 310

The network node 110 starts an LBT procedure for data transmission when a DRS is to be transmitted. The LBT procedure for data transmission may be started in a timely manner before the sub-frame boarder. In case transmitting DRS only, a short LBT procedure might be sufficient.

Action 320

The network node 110 starts an LBT procedure for DRS transmission in parallel with the LBT procedure for data transmission when a time of the LBT procedure for data transmission reaches a predefined value. At a certain time it can be obvious that the LBT procedure for data transmission will fail. This may also be used for triggering an LBT for DRS transmission. So the network node 110 may start an LBT procedure for DRS transmission in parallel with the LBT procedure for data transmission when the LBT procedure for data transmission fails.

The time for a normal LBT procedure includes a static part and another part with random number. The distribution of the random number is predefined as uniform from 0 to a max value, where the max value depends on access priority class. A lower boundary of the predefined value is given in 3GPP specification.

The predefined value for the time of the LBT procedure for data transmission is determined based on a number of subframes employed in the LBT procedure for data transmission.

The number of subframes employed in the LBT procedure for data transmission is depended on access priority class or Quality of Service. For example, latency dependent services such as VoLTE will be given a high priority class, p=1.

The access priority class describes what type of data that is sent. For downlink LAA, four Channel Access Priority Classes are defined which can be used when performing downlink transmissions in LAA carriers. Table 1 shows which Channel Access Priority Class should be used by traffic belonging to the different standardized Quality of service Class Identifier (QCIs).

TABLE 1

Mapping between Channel Access Priority Classes and QCI

| Channel Access Priority Class (p) | QCI |
| --- | --- |
| 1 | 1, 3, 5, 65, 66, 69, 70 |
| 2 | 2, 7 |
| 3 | 4, 6, 8, 9 |
| 4 | — |

According to embodiments herein, class 3 is supported which is buffered streaming data, e.g. non-conversational video, video etc.

The specific value, i.e. transmission time, threshold value etc., for LBT procedure may vary depending on applications. A more detailed description on LBT may be found in IEEE P802.19-08/0034r0.

Action 330

The network node 110 may transmit a DRS together with any data to be transmitted when the LBT procedure for data transmission is successful.

FIG. 4a shows parallel LBT procedures, exemplifying the case when LBT for PDSCH transmission is successful. As shown in FIG. 4a, during subframe N, an LBT for DRS is started in parallel with an LBT for transmission including PDSCH started earlier. The DRS transmission and additional PDSCH transmission may start at the subframe boundary when the LBT procedure for data transmission succeeds.

Action 340

The network node 110 may transmit a DRS when the LBT procedure for data transmission is unsuccessful and the LBT procedure for DRS transmission is successful.

FIG. 4b shows parallel LBT procedures, exemplifying the case when LBT for PDSCH is unsuccessful, but LBT for DRS is successful. As shown in FIG. 4b, during subframe N, an LBT for DRS is started in parallel with an LBT for transmission including PDSCH started earlier. The DRS transmission may start at the subframe boundary when the LBT procedure for PDSCH transmission fails but the LBT for DRS succeeds.

Figure 5:
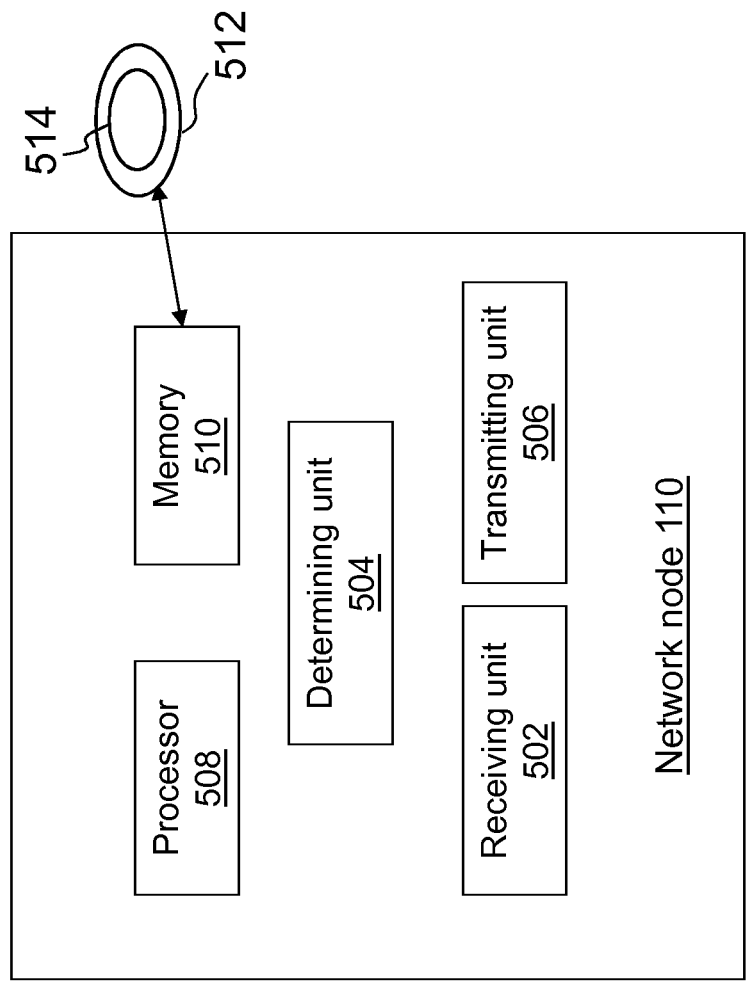
FIG. 5 is a schematic block diagram illustrating embodiments of a network node.

To perform the method actions in the network node 110 for evaluating a channel in an LAA cell in a wireless communication network 100, the network node 110 comprises circuits or units as depicted in FIG. 5. The network node 110 comprises e.g. a receiving unit 502, a determining unit 504, a transmitting unit 506, a processor 508 and a memory 510.

According to the embodiments herein, the network node 110 is configured to, e.g. by means of the determining unit 504 being configured to, start an LBT procedure for data transmission when a DRS is to be transmitted.

According to the embodiments herein, the network node 110 is further configured to, e.g. by means of the determining unit 504 being configured to, start an LBT procedure for DRS transmission in parallel with the LBT procedure for data transmission when a time of the LBT procedure for data transmission reaches a predefined value.

According to some embodiments herein, the network node 110 may be configured to, e.g. by means of the transmitting unit 506 being configured to, transmit a DRS together with any data to be transmitted when the LBT procedure for data transmission is successful.

According to some embodiments herein, the network node 110 may be configured to, e.g. by means of the transmitting unit 506 being configured to, transmit a DRS when the LBT procedure for data transmission is unsuccessful and the LBT procedure for DRS transmission is successful.

In summary, the embodiments herein provide an improved method and apparatus for evaluating a channel in a LAA cell in a wireless communication network.

According to embodiments herein, when a DRS shall be transmitted, the network node 110 starts a normal LBT for data transmission to finalizing just before the boundary of subframes employed in the normal LBT procedure. When getting closer to the boundary of subframes, starts a shorter LBT for DRS in parallel with the first normal LBT.

When approaching the boundary of subframes, there is a possibility to select what to transmit. If the normal LBT is successful it is possible to transmit DRS together with other useful data. If the normal LBT fails, there is still a possibility that the shorter LBT for DRS is successful. If so, it is possible to transmit DRS only.

Therefore, the embodiment herein adds the possibility to add more information than the DRS in a DRS subframe, without increasing the risk for not being allowed to transmit due to LBT failure. In this way, spectrum resources are utilized in a more efficient manner by means of using more resource elements when transmission is allowed.

Those skilled in the art will appreciate that the receiving unit 502, the determining unit 504 and the transmitting unit 506 described above in the network node may be referred to one circuit/unit, a combination of analog and digital circuits, one or more processors configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The embodiments herein for evaluating a channel in an LAA cell in the wireless communication network 100 may be implemented through one or more processors, such as the processor 508 in the network node 110 together with computer program code for performing the functions and actions of the embodiments herein. The program code mentioned above may also be provided as a computer program product, for instance in the form of a data carrier 512 carrying computer program code 514, as shown in FIG. 5, for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The memory 510 in the network node 110 may comprise one or more memory units and may be arranged to be used to store received information, measurements, data, configurations and applications to perform the method herein when being executed in the network node 110.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method, performed in a network node, for evaluating a channel in a License-Assisted Access (LAA) cell in a wireless communication network; the method comprising the network node:
   starting a Listen Before Talk (LBT) procedure for data transmission when a Discovery Reference Signal (DRS) is to be transmitted;
   in response to the LBT procedure for data transmission being successful, transmitting any data to be transmitted concurrently with or after the DRS, but not prior to the DRS; and
   in response to one of the LBT procedure for data transmission reaching a predefined value and the LBT procedure for data transmission failing, starting an LBT procedure for DRS transmission in parallel with the LBT procedure for data transmission.

2. The method of claim 1, further comprising transmitting a DRS when the LBT procedure for data transmission is unsuccessful and the LBT procedure for DRS transmission is successful.

3. A network node for evaluating a channel in a License Assisted Access (LAA) cell in a wireless communication network, the network node comprising:
   processing circuitry;
   memory containing instructions executable by the processing circuitry whereby the network node is operative to:

start a Listen Before Talk (LBT) procedure for data transmission when a Discovery Reference Signal (DRS) is to be transmitted; and in response to the LBT procedure for data transmission being successful, transmitting any data to be transmitted concurrently with or after the DRS, but not prior to the DRS; and in response to one of the LBT procedure for data transmission reaching a predefined value and the LBT procedure for data transmission failing, start an LBT procedure for DRS transmission in parallel with the LBT procedure for data transmission.

4. The network node of claim 3, wherein the instructions are such that the network node is operative to transmit a DRS when the LBT procedure for data transmission is unsuccessful and the LBT procedure for DRS transmission is successful.

* * * * *